Dec. 20, 1932.  R. G. FRYE  1,891,529
LATCH OPERATING DEVICE FOR POWER SHOVELS
Filed June 23, 1930
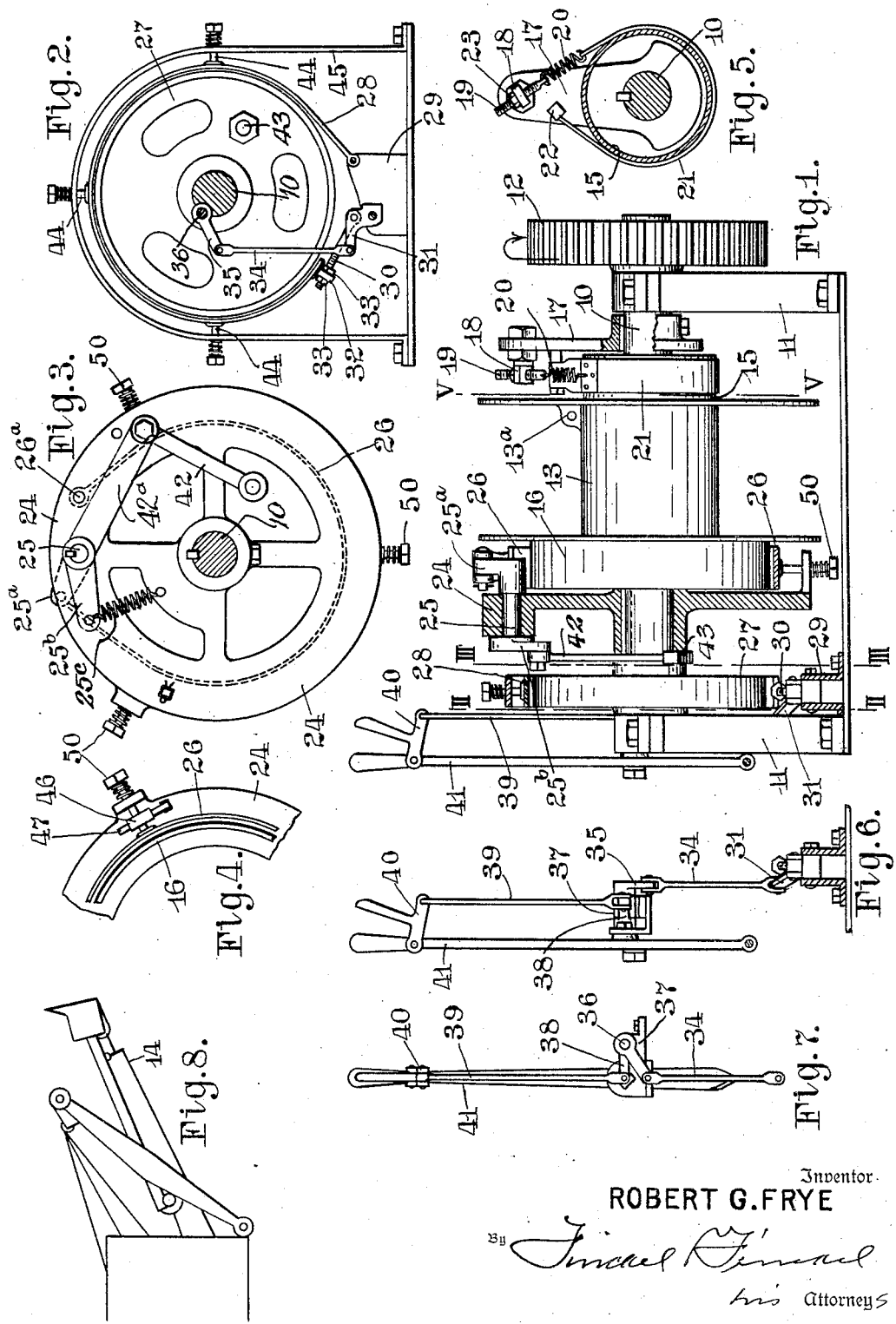
Inventor
ROBERT G. FRYE
By
his Attorneys Patented Dec. 20, 1932

1,891,529

UNITED STATES PATENT OFFICE

ROBERT G. FRYE, OF HILLIARDS, OHIO

LATCH OPERATING DEVICE FOR POWER SHOVELS

Application filed June 23, 1930. Serial No. 463,074.

This invention relates to power shovels and has for one of its objects to provide an improved and simplified mechanism for operating the trip whereby this operation may be performed with ease and certainty. Another object of the invention is to so construct such mechanism that the slack of the cable of the trip means is kept constantly taut and ready for quick operation. Other objects and advantages will appear from the disclosure herein.

The invention is embodied in the example herein shown and described.

In the accompanying drawing:

Fig. 1 is generally a view in front elevation with parts in section and broken out.

Fig. 2 is a section on the line II—II, Fig. 1, looking to the right.

Fig. 3 is a view on the line III—III looking to the right.

Fig. 4 is a detail in fractional view of primary brake strap.

Fig. 5 is a section on the line V—V looking to the right.

Fig. 6 is a detail in side view of the control means alone.

Fig. 7 is a view looking at the right hand side of Fig. 6.

Fig. 8 is a general outline sketch somewhat diagrammatic illustrating parts of a power shovel or dipper.

In the view 10 designates a rotary shaft journaled in suitable standards 11 on the floor of the power shovel.

Said shaft is rotated in one direction by means of a spur gear 12 constantly meshing with a gear (not shown) of the usual power operated shaft of the main shovel operating mechanism.

Loose on the shaft 10 is a cable winding drum 13 having large ends and having an eye 13ª for the attachment of the end of the shovel latch operating cable 14 (see Fig. 8). Formed at opposite ends of the winding drum beyond its heads are brake drums 15 and 16. Keyed to the shaft 10 to rotate therewith near the brake drum 15 is an arm 17 in the outer end of which is removably fixed by nuts a lateral eye-bolt 18. In the eye of bolt 18 is another eye-bolt 19 having attached thereto one end of a coil spring 20 the other end of which is attached to one end of a friction belt 21. The other end of the belt 21 is anchored to a lateral pin 22 on the arm 17. The said friction belt 21 is designed to be held constantly against the surface of brake drum 15 with a friction regulated by tension of spring 20 adapted to take up the slack of latch cable 14 but not adapted by itself to release the shovel latch. The regulation of the applied friction of the belt 21 is effected by means of a nut 23 on the outer side of the eye bolt said nut being raised or lowered on the thread of the bolt to increase or diminish the tension of said spring and therefore the amount of friction applied by said belt 21 to the brake drum.

Keyed or otherwise secured to the shaft 10 next to the brake drum 16 is a circular wheel frame 24 in which is journaled eccentrically a short shaft 25 having a bell crank arm 25ª at one side of the frame 24 and a bell crank arm 25ᵇ at the opposite side of said frame. The bell crank arm 25ª has connected with it one end of a friction brake band 26 the other end being anchored at 26ª to the wheel adapted to be applied to the brake drum 16. Loose on the shaft 10 next to the frame wheel 24 is a retard wheel 27 around which is band 28.

One end of said brake band 28 is anchored to a stationary bracket 29 while the other end is secured to a threaded eye bolt 30 pivoted on said bracket 29 by means of a lever 31. The threaded eye-bolt 30 is extended through a perforated ear 32 on the end of the brake band 28 and secured by two nuts 33, 33, on opposite sides of an eye piece on the band so that said brake band can be adjusted for wear. The lever 31 is connected by a link 34 with a crank arm 35 extending from a short shaft 36 journaled in a small bracket 37 in rear of the bearing of shaft 10. Said shaft 36 is also provided with another crank arm 38 connected by means of a rod 39 with a thumb operated lever 40 pivoted to the control lever 41 of the main bucket operating mechanism so that by pressing the thumb piece of said thumb lever toward the lever 41 the brake band 28 can be drawn at its free end (as indicated in Fig. 2) and applied to the retard or brake wheel 27 and therefore hold said wheel and cause the bell crank arm 25ᵃ to effect an application of the friction band 26 to the brake drum 16 as will now be explained. The wheel frame 24 and the retard wheel 27 are connected together by means of a toggle lever composed of arms 42 and 42ᵃ pivoted at one end to a pin 43 on the retard wheel 27 and secured at its other end to the bell crank shaft 25 so that the rotation of the shaft 10 causes the rotation of the retard wheel 27. A coil spring 25ᶜ acting on the shaft 25 through the bell crank arm 25ᵇ tends to hold the friction band of the brake drum removed from that drum but when, upon pressing the thumb piece 40, friction is applied to the wheel 27 and the rotation of said wheel is retarded there is caused an actuation of the crank arm 25ᵃ outward and an application of the brake band 26 to the drum 16. This operation results in a greater pull than normal on the latch cable and therefore the release of the shovel door.

As shown in Fig. 2 the brake band 28 is held yieldingly removed from the drum 27 by means of pins 44 connected with the brake band 28 and extending through a frame 45 said pin being provided with a coil spring pressing on the frame and against a head on the pin.

The band 26 of the drum 16 is shown to be held by similar means except that one of the pins 50 nearest the anchored end of the band is provided with a sleeve 46 that slides on a short rod 47 having a bend and extended through a hole in the wheel and fastened by a cotter pin at the opposite side (see Figs. 3 and 4).

The shaft 10 and the parts keyed thereto rotate in the direction indicated by the arrow Fig. 1 and the rotation of the wheel 24 by reason of the toggle connection 42 and 42ᵃ carries the loose friction drum 27 with it, hence if the wheel 27 be held by an imposed retarding friction the crank arm 25ᵇ will be thrown outward; and the crank arm 25ᵃ and with it the band 26 also thrown outward thereby drawing the band 26 into frictional contact with the drum 16. The means for actuating the crank arms 25ᵃ and 25ᵇ is the thumb member 40 and the rod 39 upon the elevation of which the rod 34 is raised thereby drawing friction band 28 down at its free end and into frictional contact with the drum 27.

It will be noted that the connections are such that the control lever 41 can be moved to operate the main bucket operating mechanism without actuating the shovel trip mechanism.

The forms of the parts can be changed without departing from the gist of the invention as claimed.

What I claim is:

1. In means of the kind described, a power shaft to rotate in one direction, a cable winding drum loose on said shaft, said cable winding drum having a friction drum, an arm secured to said power driven shaft to rotate therewith, a brake band for application to the perimeter of said friction drum, said band anchored at one end to said arm and resilient means anchoring said band at its other end to said arm, said last named anchored end being, in operation, the advancing end of said brake band.

2. In means of the kind described, a power shaft to rotate in one direction, a cable winding drum loose on said shaft, said cable winding drum having a friction drum, an arm secured to said power driven shaft to rotate therewith, a brake band for application to the perimeter of said friction drum, said band anchored at one end to said arm and adjustable resilient means anchoring said band at its other end to said arm, said last named anchored end being, in operation, the advancing end of said brake band.

3. In means of the kind described, a power shaft to rotate in one direction, a cable winding drum loose on said shaft, said cable winding drum having a friction drum, an arm secured to said power driven shaft to rotate therewith, a brake band for application to the perimeter of said friction drum, said band anchored at one end to said arm and resilient means anchoring said band at its other end to said arm, said resiliently anchored end being, in operation, the advancing end of said brake band, a second friction drum on said cable winding drum, a wheel frame having a brake band for application to the perimeter of said second friction drum anchored at one end thereto, and a toggle lever to which the other end of said last named band is anchored, said toggle lever operating with diminishing power in applying said last named brake band to its drum.

4. In means of the kind described, a power driven shaft to rotate in one direction, a cable winding drum loose on said shaft, said cable winding drum having a friction drum, an arm secured to said power driven shaft to rotate therewith, a brake band for application to the perimeter of said friction drum, said brake band anchored at one end to said arm, and resilient means anchoring said band at its other end to said arm, said resiliently anchored end being, in operation the advancing end of said brake band, a second friction drum on said cable winding drum, a wheel frame carrying a brake band for application to the perimeter of said second friction drum, said brake band having one end thereof anchored to said wheel frame, a bell-crank lever journaled in said wheel frame to one arm of which the other end of said brake band is connected, a retard wheel loose on said shaft, a toggle lever connecting said bell-crank lever and the retard wheel, said toggle lever constructed to operate with diminishing power in applying the brake band to said second mentioned drum.

5. In means of the kind described, a power driven shaft to rotate in one direction, a cable winding drum loose on said shaft, said cable winding drum having a friction drum, an arm secured to said power driven shaft to rotate therewith, a brake band for application to the perimeter of said friction drum, said brake band anchored at one end to said arm, and resilient means anchoring said band at its other end to said arm, said resiliently anchored end being, in operation the advancing end of said brake band, a second friction drum on said cable winding drum, a wheel frame carrying a brake band for application to the perimeter of said second friction drum, said brake band having one end thereof anchored to said wheel frame, a bell-crank lever journaled in said wheel frame to one arm of which the other end of said brake band is connected, a retard wheel loose on said shaft, a toggle lever connecting said bell-crank lever and the retard wheel, said toggle lever constructed to operate with diminishing power in applying the brake band to said second mentioned drum and manually operated means for retarding the motion of said retard wheel.

6. In means of the kind described, a power driven shaft to rotate in one direction, a cable winding drum loose on said shaft, said cable winding drum having a friction drum, an arm secured to said power driven shaft to rotate therewith, a brake band for application to the perimeter of said friction drum, said brake band anchored at one end to said arm, and resilient means anchoring said band at its other end to said arm, said resiliently anchored end being, in operation the advancing end of said brake band, a second friction drum on said cable winding drum, a wheel frame carrying a brake band for application to the perimeter of said second friction drum, said brake band having one end thereof anchored to said wheel frame, a bell-crank lever journaled in said wheel frame to one arm of which the other end of said brake band is connected, a retard wheel loose on said shaft, a toggle lever connecting said bell-crank lever and the retard wheel, said toggle lever constructed to operate with diminishing power in applying the brake band to said second mentioned drum and resilient means for normally holding said second mentioned brake band removed from the perimeter of its brake drum.

ROBERT G. FRYE.